United States Patent [19]

Lee

[11] Patent Number: 5,009,027
[45] Date of Patent: Apr. 23, 1991

[54] FISHING ROD HOLDER

[76] Inventor: Guo-Shin Lee, No. 26, Chien-Te Street, Taichung City, Taiwan

[21] Appl. No.: 464,376

[22] Filed: Jan. 12, 1990

[51] Int. Cl.⁵ .............................................. A01K 87/00
[52] U.S. Cl. ....................................... 43/21.2; 248/533
[58] Field of Search ................. 43/21.2; 248/530, 533, 248/535; 403/53, 56

[56] References Cited

U.S. PATENT DOCUMENTS

| | | | |
|---|---|---|---|
| 2,137,645 | 11/1938 | Doench | 43/21.2 |
| 2,548,351 | 4/1951 | Coombs | 43/21.2 |
| 2,694,538 | 11/1954 | Consolo | 248/533 |
| 3,020,014 | 2/1962 | Emery | 248/533 |
| 3,033,503 | 5/1962 | Wenderski | 43/21.2 |
| 3,290,816 | 12/1966 | Eklof | 43/21.2 |
| 4,199,179 | 4/1980 | Curry | 403/56 |
| 4,261,128 | 4/1981 | Dobbins | 43/21.2 |
| 4,438,612 | 3/1984 | Bernard | 403/56 |
| 4,694,603 | 9/1987 | Anderson | 43/21.2 |
| 4,730,408 | 3/1988 | Miller | 43/15 |
| 4,763,435 | 8/1988 | Deering | 43/21.2 |
| 4,793,086 | 12/1988 | Cup | 43/21.2 |
| 4,827,654 | 5/1989 | Roberts | 43/21.2 |

Primary Examiner—Kurt Rowan
Attorney, Agent, or Firm—Morton J. Rosenberg; David I. Klein

[57] ABSTRACT

A fishing rod holder includes a holster member, can be rotated to any different position, for receiving a fishing rod. The fishing rod holder further includes a rotatable stake member pivotally connected to a pivot member with said holster member, whereby the holster member and the stake member can be pivoted together to the pivot member and rotated as required within the pivot member with a plurality of steel balls preventing removal of the holster member and the stake member from the pivot member.

2 Claims, 6 Drawing Sheets

FISHING ROD HOLDER

FIELD OF THE INVENTION

This invention relates in general to the field of fishing gear and more particularly to a device which holds a fishing rod and rotates both vertically and horizontally to desired position.

DESCRIPTION OF THE PRIOR ART

Illustrative of devices for supporting a fishing rod are those disclosed in U.S. Pat. Nos. 2,491,008 / 2,954,909 / 233,036 / 4,763,435 / 4,793,086 / 4,730,408 / 4,694,603 / 4,827,654 etc., because such support devices are only capable of supporting a fishing rod with a given length and fixing it in a given terrain, they all fail to meet the needs of fisherman desiring to fish with a plurality of lengths or sizes of fishing rod and in different terrain such as coast, cape, estuary, shoal, spit, lake, pond, greek or rapid etc.

Further, none of the foregoing patents is foldable to save space, and easy to carry or store.

In U.S. Pat. No. 4,827,654, the first and second cylindrical portions being integral with the open sides of the first and second cylindrical portions are axially displaced only by 180°, is also within the limits of a few given terrains.

In another U.S. Pat. No. 4,763,435, the fishing rod holder can be detached and folded flat for storage or carrying and is also difficult to engage or disengage because of a multiplicity of parts and assemblies.

To overcome the shortcomings of such prior art systems, the present invention is designed to be wed with a foldable and rotatable fishing rod holder easily attached and securely fixed to the rod butt and sits on the surface of any terrain. Further, it can be easily adjusted to a wide variety of angles relative to the water being fished.

Finally, said rod holder is light and durable, easy to use and versatile, also, the low cost of production makes said rod holder available for the majority of consumers.

SUMMARY OF THE INVENTION

The present invention is a system designed to hold a fishing rod up off of environmental surfaces thereby protecting said rod while holding said rod at a desirable angle relative to the body of water being fished.

Another object of the invention is to make it foldable for carrying and easy storage, said rod holder also can save more space than the prior art rod holders.

A further object of the invention is to have said rod holder be rotatable as a means of being able to meet any length or size of fishing rod and secure it is any different terrain.

The invention and objects and features thereof will be more readily apparent from the following detailed description and appended claims when taken with the drawing.

DETAILED DESCRIPTION OF THE PREFERRED EMBODIMENT

Figure 1:
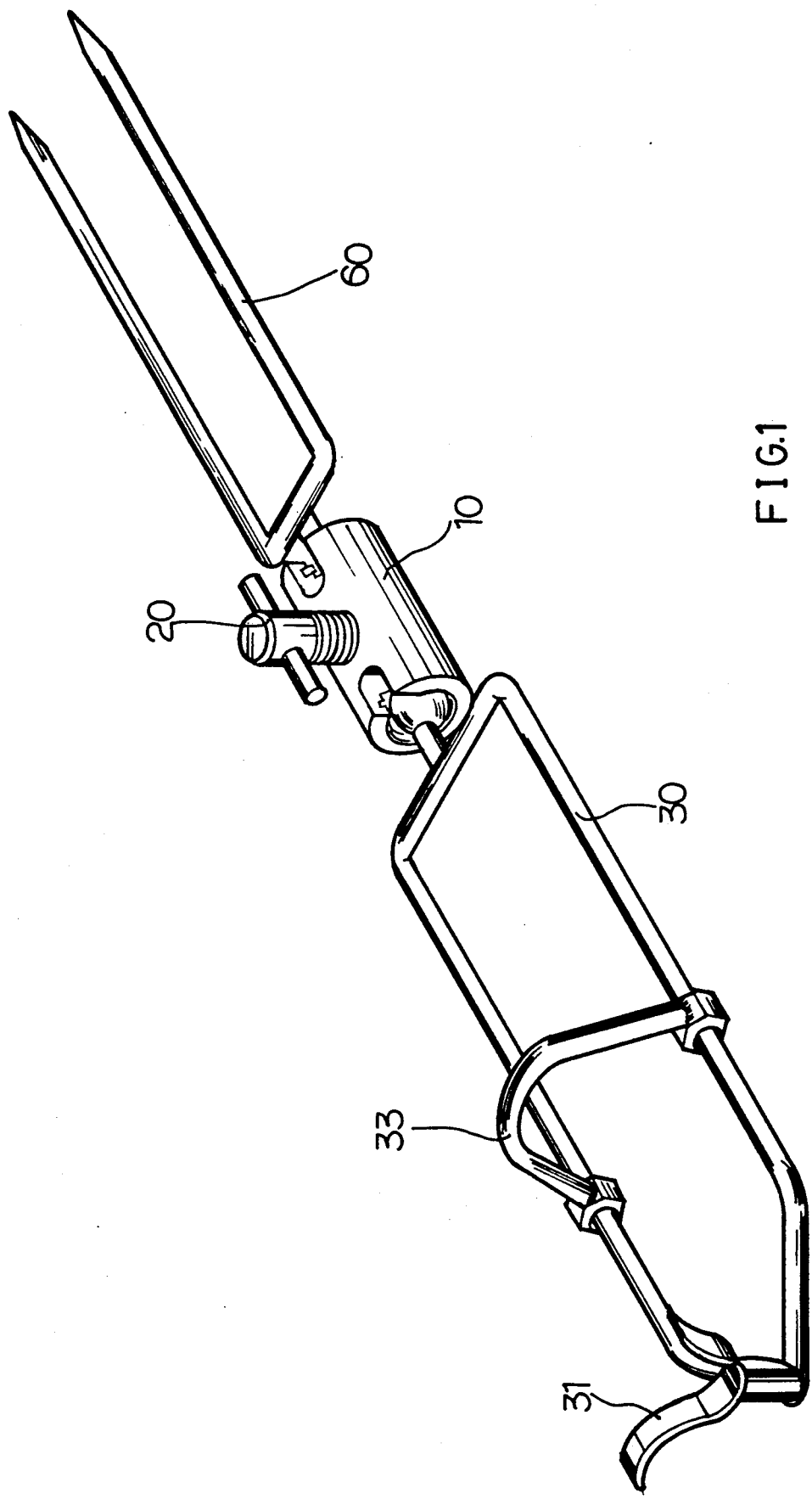
FIG. 1 is a perspective view of the present invention for use.
Figure 2:
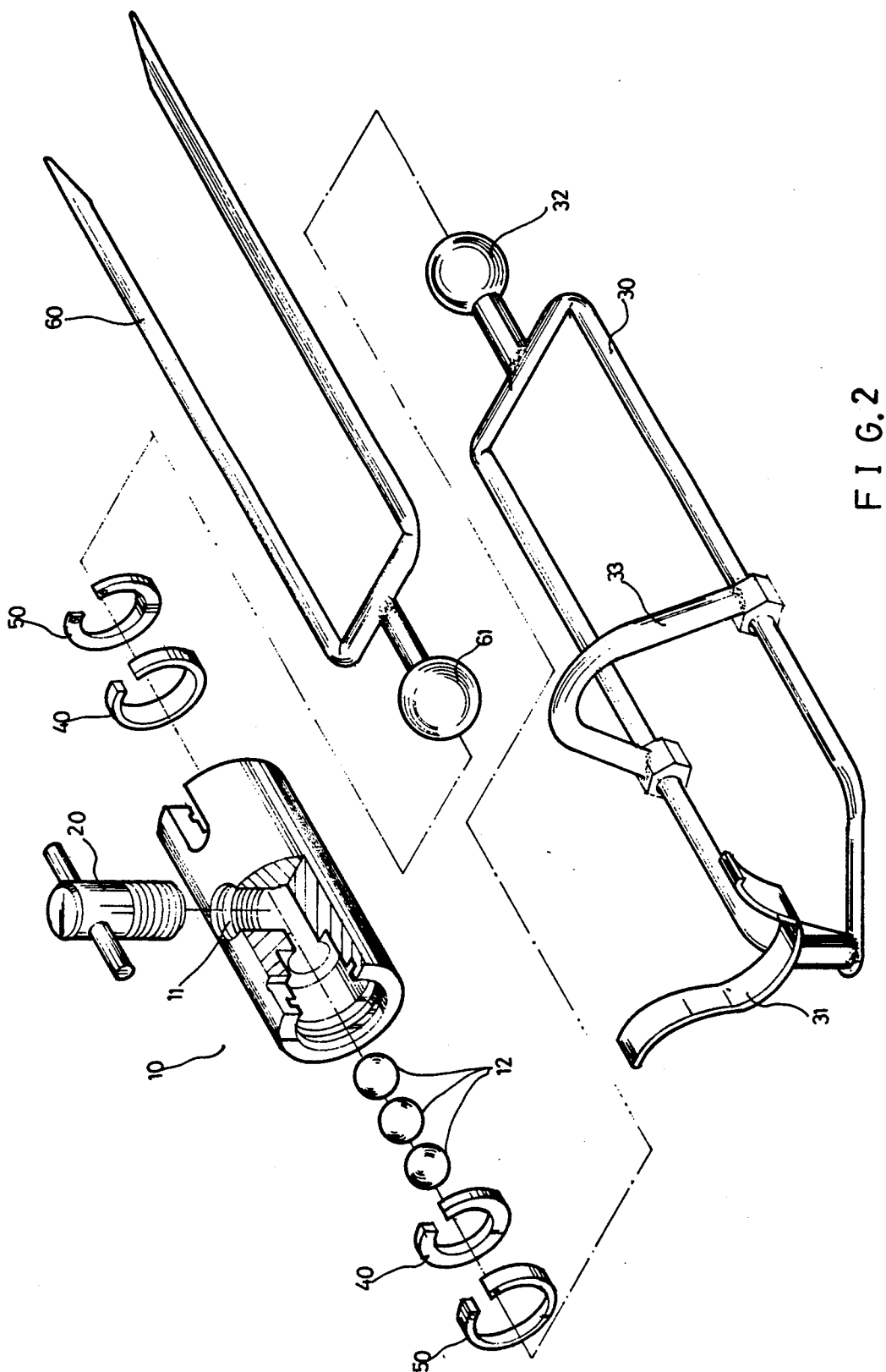
FIG. 2 is a exploded perspective view in accordance with the embodiment of the present invention.

Referring now to the drawing, FIG. 1 is a perspective view and FIG. 2 is a exploded perspective view in accordance with the present invention. The fishing rod holder comprises a pivot member 10 for connecting the holster member 30 and the stake member 60 described detailed as follows. Pivot member 10 includes a cylindrical portion having an axially directed through and opening a bolt hole 11 wherein three steel balls 12 can be placed within the cylindrical portion, and a bolt 20 fixed to the bolt hole 11 of the pivot member 10 for securing and fixing closely the holster member 30 and the stake member 60.

The fishing rod holder further comprises a holster member 30 for supporting the fishing rod. Holster member 30 includes a v bended tail 31 on which the handle of fishing rod can be put, and an adjustable support 33 can be pushed forward or backward to support different length of fishing rod. A ball head 32, welded to one end of the holster member 30, can be inserted and pivotted to one end of the pivot member 10 with a ball head holder 40 and a C-ring 50 so that the holster member 30 can be rotatably adjusted to desired position or angle.

Figure 3:
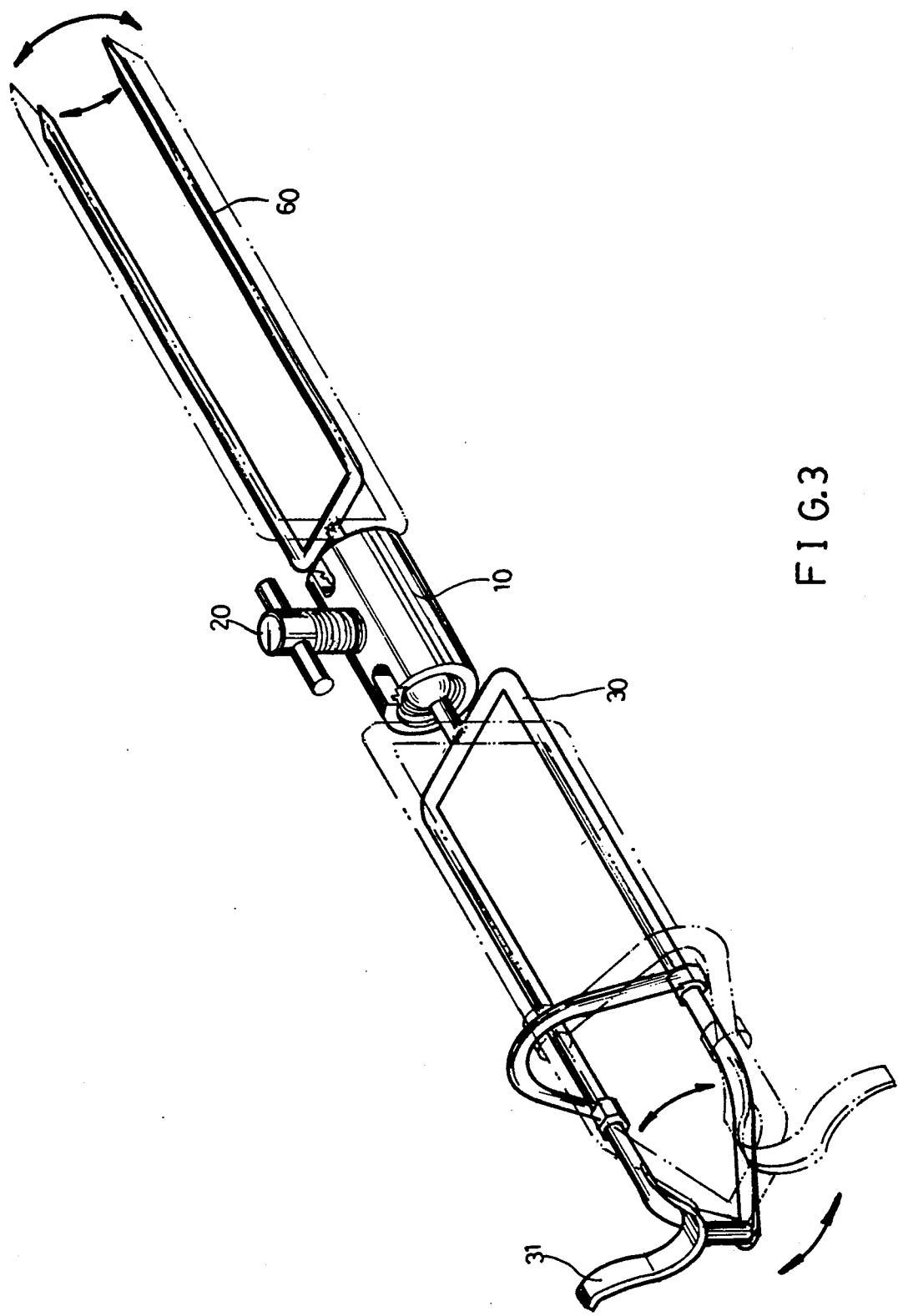
FIG. 3 is a perspective view of the present invention when it is folded back.

In accordance with the present invention, the stake member 60 also comprises a ball head 61 insertable and pivotable to the other end of the pivot member 10 with a ball head holder 40 and a C-ring 50 by the same manner as the holster member 30, and a fork-like device for inserting into the surface of any terrain at any angle by rotating and adjusting the stake member 60 and said pivot member 10 which is shown in FIG. 3 with the rotatable holster member 30.

Figure 4:
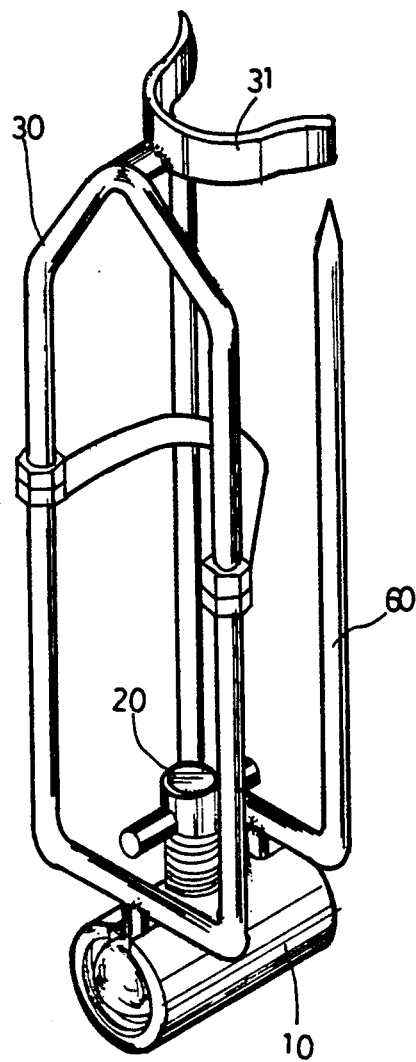
FIG. 4 is a perspective view of the present invention and shows its rotatable manner.

FIG. 4 is a exploded view of the present invention when it is folded back for carrying or storage to save more space than any prior art.

Figure 5B:
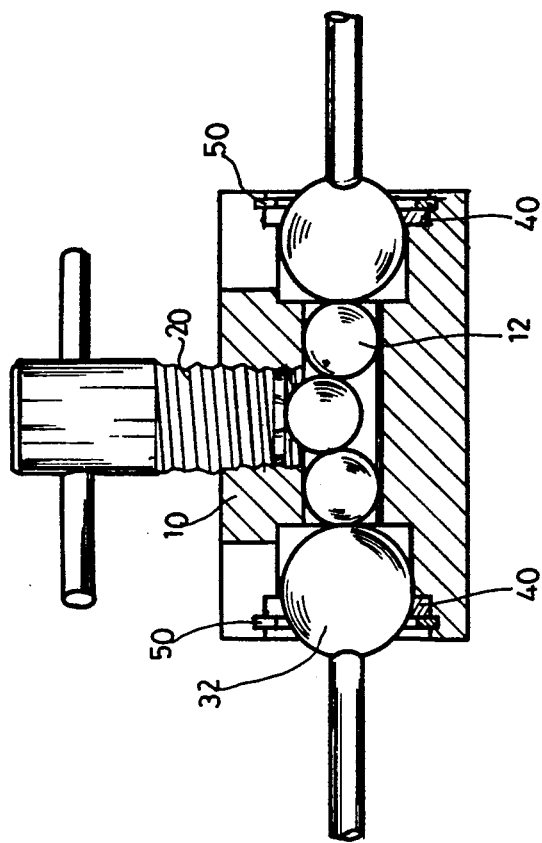
FIG. 5B is partial enlargement of longitudinal section view for the pivot member of the present invention when it is pushed and turned around closely.
Figure 5A:
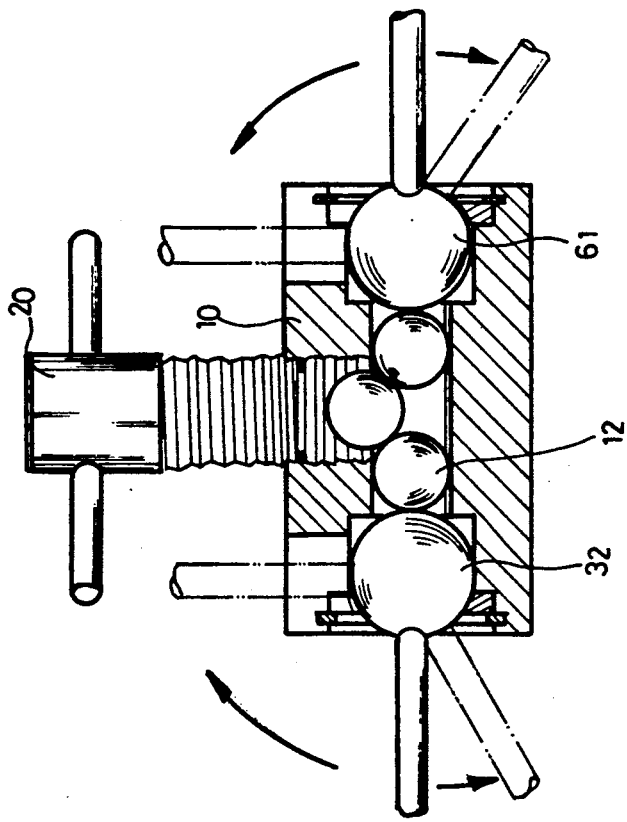
FIG. 5A is partial enlargement of longitudinal section view for the pivot member of the present invention when it is released.
Figure 6:
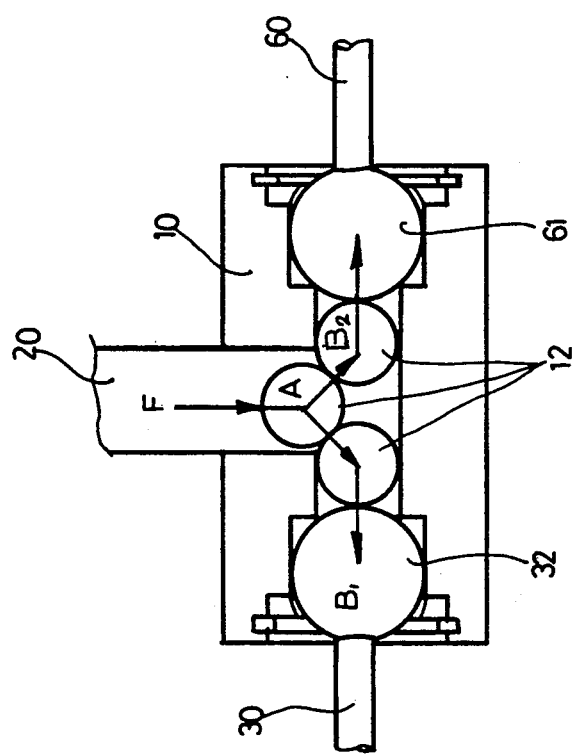

For more detailed description, please turned to FIG. 5A and FIG. 5B. head 32,61 and three steel balls 12 can be inserted and secured within the cylindrical portion of the pivot member 10 after the ball head holder 40 and C-ring 50 is fixed and aligned securely to the slot on the interior surface of the cylindrical portion of the pivot member 10 when disengaging, the bolt 20 is unscrewed and released which is shown in FIG. 5A, and the ball head 32 and 61 can be released and disengaged because those three steel balls 12 are not pressed and pushed to the ball head 32 and 61 by the bolt 20. But, if the bolt 20 is screwed and pushed downward, the middle steel ball 12 will be pressed by the bolt 20 and pushed through the rest two steel balls 12 to the ball head 32 and 61 and then pushed against the ball head holder 40. By the means of said structure, the holster member 30 and the stake member 60 is pivotted and fixed securely to the pivot member 10 which is shown in FIG. 5B.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is the following:

1. A fishing rod holder comprising:

A pivot member including a cylindrical portion having an axially directed through opening and a bolt hole wherein a plurality of steel balls are positionally located within the cylindrical portion through opening, and a bolt threadedly fixed to the cylindrical portion within the bolt hole;

a holster member including a bracket, an adjustable support and a ball head, said ball head insertable within said pivot member through opening and pivoted to a first end of said pivot member with a first ball head holder and a first C-ring; and, a stake member including a ball head formed on a first end thereof and a fork-like device at a second end thereof, said stake member ball head inserted and pivoted to a second end of said pivot member with a second ball head holder and a second C-ring.

2. The fishing rod holder as recited in claim 1 wherein each of said ball head holders include an open-mouthed holder having a concave arcuate contour forming an interior surface.

* * * * *